US006304758B1

(12) United States Patent
Iierbig et al.

(10) Patent No.: US 6,304,758 B1
(45) Date of Patent: Oct. 16, 2001

(54) METHOD AND SYSTEM FOR PROVIDING AND TRANSMITTING INDIVIDUALIZED TRAFFIC INFORMATION

(75) Inventors: Wolfgang Iierbig, Hilden; Bettina Hoischen, Düsseldorf; Jürgen Gaida, Neuss; Uwe Köhler, Monheim; Werner Schulz, Meerbusch, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/367,635

(22) PCT Filed: Feb. 18, 1998

(86) PCT No.: PCT/DE98/00533

§ 371 Date: Aug. 19, 1999

§ 102(e) Date: Aug. 19, 1999

(87) PCT Pub. No.: WO98/38618

PCT Pub. Date: Sep. 3, 1998

(30) Foreign Application Priority Data

Feb. 25, 1997 (DE) ........................................ 197 08 748

(51) Int. Cl.[7] ........................................ G06F 165/00

(52) U.S. Cl. ........................ 455/456; 455/413; 455/414; 340/905; 340/988; 701/117

(58) Field of Search .............................. 455/446, 456, 455/457, 413, 514, 412, 414; 701/117; 340/905, 988, 989

(56) References Cited

U.S. PATENT DOCUMENTS

| | | | | |
|---|---|---|---|---|
| 4,350,970 | * | 9/1982 | Von Tomkewitsch | 340/905 |
| 4,812,843 | * | 3/1989 | Champion, III et al. | 340/905 |
| 5,187,810 | * | 2/1993 | Yoneyama et al. | 340/905 |
| 5,802,526 | * | 9/1998 | Fawcett et al. | 379/67 |
| 5,812,653 | * | 9/1998 | Jodoin et al. | 379/205 |
| 5,822,310 | * | 10/1998 | Chennakeshu et al. | 370/317 |
| 6,073,075 | * | 6/2000 | Kondou et al. | 701/203 |

* cited by examiner

*Primary Examiner*—Lee Nguyen
*Assistant Examiner*—Simon Nguyen
(74) *Attorney, Agent, or Firm*—Cohen, Pontani, Lieberman & Pavane

(57) ABSTRACT

A method and system for providing and transmitting individualized traffic information from a traffic network to a user via a telephone network and at least one voice channel. Traffic information is requested by the user from an information center that is capable of searching a traffic database and includes a voice generator for transmitting searched traffic information to the user in spoken form using the voice channel. The user request to the information center is character coded and a reference code is assigned to the traffic information being searched responsive to the user's request (call) and then transmitted to the user.

38 Claims, 1 Drawing Sheet

METHOD AND SYSTEM FOR PROVIDING AND TRANSMITTING INDIVIDUALIZED TRAFFIC INFORMATION

BACKGROUND OF THE INVENTION

The invention relates to a method and system for providing and transmitting individualized traffic information in spoken form.

DESCRIPTION OF THE RELATED ART

A multiplicity of methods are known for providing traffic information in voice form to interested users, in particular automobile drivers. The transmission media used in these methods include, in particular, broadcast radio, television and other broadcasting media. This class of methods has the common feature that the sender of the information does not know the current situation of the user, in particular his current location, and all the available information is always transmitted within a relatively large geographical region. Information transmission carried out in a corresponding manner in response to an individual request would lead not only to a high load on the communication channel but also to considerable overloading of the user, since he would be "buried" in a multiplicity of information items that were not currently relevant to him.

Furthermore, methods are known which allow a request by a user and in this case allow the information center to take account of individual user problems. So-called "hotlines" or "call centers" represent one example of this. These are suitably equipped telephone centers which take account of the users' wishes and answer questions. In the specific application area of traffic information, corresponding services are known, for example, from mobile radio networks or the automobile clubs. These services are distinguished by high costs for the operator and, in the end, for the user as well, since the services have to be provided manually. Furthermore, automated systems are known, which lead the user to a selection menu using the voice mode, in order to select and to provide the desired information. These voice dialog systems are used in telephone networks, for example, for travel route information, but recently for traffic information services as well. In this case, the information is offered in voice form, while menu control in telephone networks is typically possible by voice input and/or by pressing keys. The disadvantage of these known systems is the depth and complexity of the menu, particularly in the case of complex applications such as the transmission of traffic information.

Both classes of methods are distinguished by the information being presented in spoken form. Particularly while driving, this audible form of information presentation offers ergonomic advantages, for example in comparison with a visual presentation on a display. The formulation of the request in voice form is, however, either expensive in terms of manual handling, or is complex and time-consuming in automated handling.

SUMMARY OF THE INVENTION

The object of the invention is to propose a cost-effective, efficient and ergonomic method, for providing individualized traffic information and a system for carrying out this method, avoiding the disadvantages described above. The essential aim in this case is to limit the information transmission as far as possible to that traffic information which may actually be meaningful to the user.

The provision and transmission of the desired traffic information are carried out in a three-stage process. In the first process step, the request for traffic information is transmitted from the user/terminal to the information center, with the request being made in character-coded form and including at least details relating to a geographical position. The geographical position, this is preferably the user's current position, is a first selection criterion for the information center to select the relevant traffic information. By including further information in the request, in particular the direction of travel or traffic information which has already been obtained and/or is known by the user, the selection can be further refined according to the invention, and the relevance can thus be enhanced further by suppressing irrelevant or redundant information. According to the invention, the request is made in character-coded form in order to allow automated processing. The request results in an order being opened in the information center, and this order is given a unique order number, which is called the reference code in the following text. In the second process step, the details transmitted in the request are used in the information center to search for the desired information in a traffic database, and to collate this information. The information is provided under this reference code in the information center, and a message with the reference code is transmitted to the user. In the third process step, the user calls the information which is kept available, quoting the reference code, via the voice channel of a telephone network. If no relevant traffic information is available or predetermined fault conditions have occurred in the search, a development of the invention provides for special predefined reference codes to be transmitted to the user in this case, which contain appropriate information so that the process can be terminated without setting up a voice link and without the telephone charges incurred in so doing.

The described breakdown into three process steps achieves a number of advantages over the previously known methods. Firstly, the voice link is essentially used only for listening to the information. The entire time-consuming selection process (which may be susceptible to faults) in the voice channel is avoided, and the information is presented in compact form, efficiently and cost-effectively. Secondly, the selection process is reduced just to a request, and it is sufficient to state a geographical position. There is no need for any tedious, multistage interactive selection process as in voice dialog systems. Thirdly, the request and response are an interchange of coded information which can be handled expediently and cost-effectively not via the voice channel but as short messages via special data channels in the telephone network. This can be done, for example, by the so-called short message channel (SMS channel) in a GSM mobile radio network. Fourthly, by means of the interposed process step providing and transmitting back a "collection address" (=reference code), the called channel can be set up from the user end. This is by far the most costly transmission step in the methods. The communication costs are thus largely borne directly by the user. Since, as a result of the provision of special telephone numbers with increased tariffs, modern telephone networks also offer the capability for billing so-called premium services, the service can be charged for without any problems via the user's telephone charges. There is no need for any special charge to be made or a contract to be established between the user and the traffic information provider. The service can thus be offered without any problems to the general public since, whenever it is used, it can be paid for just via the telephone charges. Fifthly, the method offers the further advantage that no voice link whatsoever need be set up unless information is available. The user therefore does not first of all need to take a tedious and costly route through a selection menu, just to find out that there are no traffic messages for his route.

BRIEF DESCRIPTION OF THE DRAWINGS

The invention is explained in the following text using an example of a sequence as shown in the single FIGURE.

DETAILED DESCRIPTION OF THE DRAWINGS

Figure 1:
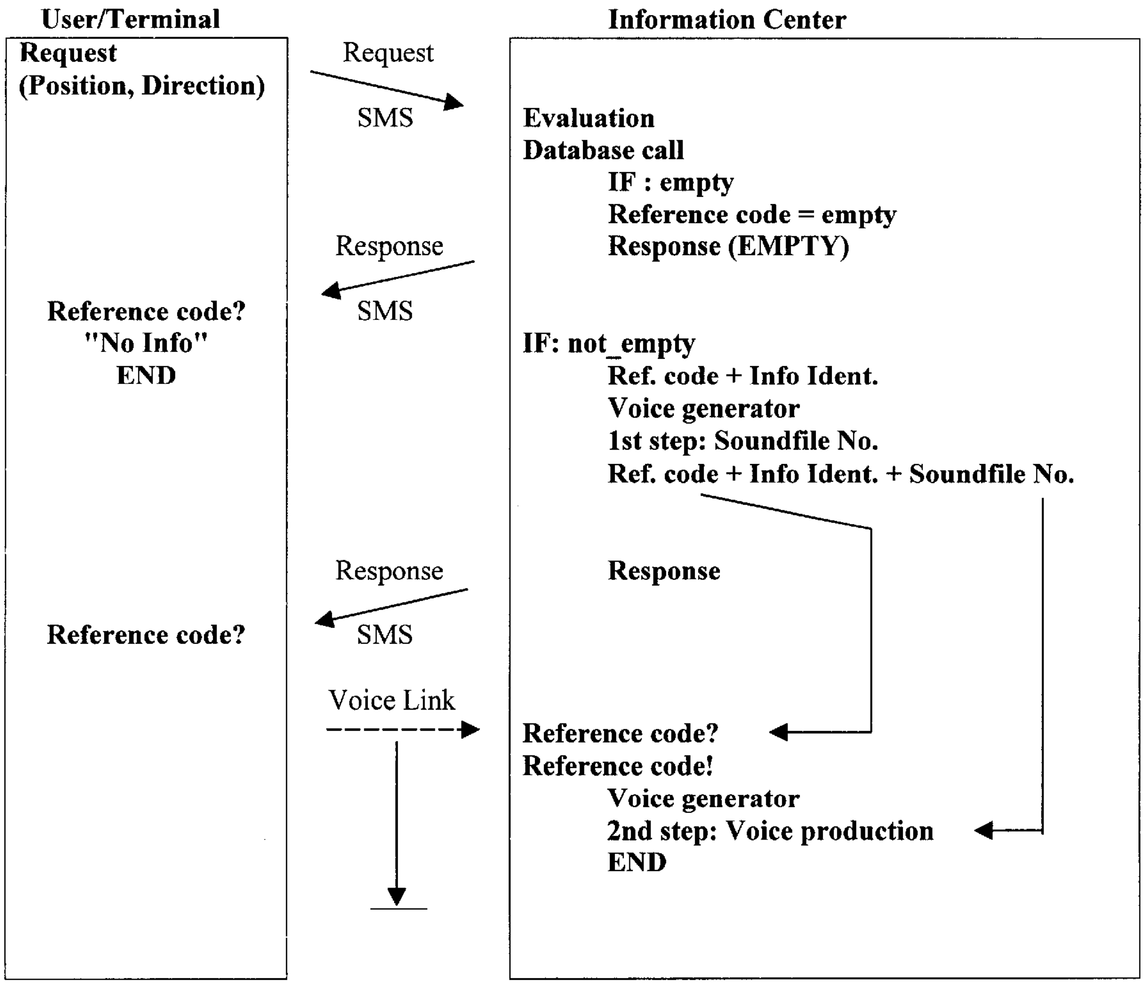

The method starts with a request by a user for traffic information. "Request" in the sense of the invention means that the user also transmits information for the individualization of his request to the information center, in addition to the pure request for information to be produced. The user's geographical position is transmitted as basic information in this case. As a rule, this will be the user's current location, so that only the messages in the vicinity of this geographical position are collated in the individual search through the available traffic information. However, the invention can also advantageously be used if the geographical position is not the user's current location. It is thus also possible to ask for information relating to the destination point or information relating to the traffic situation in regions in which fleet vehicles are located.

As a basis for the search process, the geographical position is sufficient to check, for example, traffic information "within a radius of 50 km". A further refinement of the invention is achieved by transmitting additional information, such as the direction of travel, in the request. These details allow, for example, messages relating to traffic jams in the opposite direction of travel to be suppressed. The principle of the sequence can also advantageously be extended by transmitting a number of geographical positions, in particular a travel route.

There are various options in the sense of this invention for inputting the geographical position. The geographical position could, for example, be entered by the user via a keypad or keyboard. One typical application could be, for example, a check from a personal computer (PC) at home or in the office. Automatic production of such data is particularly worthwhile for use in a vehicle, for example by using position-finding or navigation units that are now available on the market. In this case, the geographical position is defined, for example in geographical coordinates (for example WGS84) by satellite-based position findings. According to the invention, these coordinates can then be used for the request.

The request is transmitted to the information center. Since the information in the request is in character-coded form, one preferred form of transmission, as is shown in the FIGURE, is transmission in the sense of a data message as a short message (SMS=short message service) in a GSM mobile radio network.

Upon receiving the request, an order is opened in the information center, and is given a unique reference code (order number).

The information received with the request is evaluated in the information center. This includes, in particular, the evaluation of the geographical position. However, other optional parameters, such as the direction of travel, are also useful selection criteria. As a result of this evaluation, the information center knows (at least) a geographical region for which traffic information is desired. This geographical region is the basis of the subsequent search in the database.

One simple solution for defining the geographical region is to use a circle of, for example, 20 or 50 km around the transmitted geographical position. In a refinement of the invention, various geometric shapes can be predetermined. These may be, for example, circles of different size or else shapes with a preferred direction ("lobe", "funnel", "slice of cake", etc). The control capability can be used very advantageously centrally to further suppress redundant or irrelevant information. This will be explained using a simple example: if the location transmitted in the request (for the sake of simplicity, the current location) is on a motorway, then a directed shape is chosen, with long range and with the preferred direction corresponding to the current direction of travel. If, for example, the user is in a built-up area, circular information is expediently selected.

A further very interesting refinement is provided if the user can also influence this selection. To this end, the user can transmit a control parameter as additional information with the request, for example defining the shape and/or size and/or alignment of a region. Information to influence centrally stored control parameters can also be transmitted.

The traffic database is searched (Datebase Call) on the basis of the region defined in the respective request. If there are no messages (reference code=empty), a message stating this (i.e., no info) can advantageously be transmitted back to the user. On receiving this information (i.e., no info), the entire process can then be terminated (END). The reference code can be set to a predetermined value (fault code).

If traffic information is available for the region being searched, then the information is collated as an "order" and is retained for a specific time period in a memory device in the information center, under the reference code (order number). The reference code is transmitted back to the user, and the user can now call the information that has been provided, via the voice channel (link), within this time period. The "order" is automatically deleted centrally after the call or after this time period (maximum one hour) has elapsed.

This method can advantageously be carried out automatically by means of an appropriately programmed electronic data processing system in the information center, but in principle can also be carried out manually or semi-manually. The information collated under the "order" could, for example, be read to the user when he calls, or could be spoken onto tape.

This basic principle of the invention can, however, be refined very advantageously as will be explained further with reference to the FIGURE. In order to keep the process as cheap as possible for the user and operator, the aim is preferably for the process to be handled fully automatically. A voice generator can be used for this purpose. Since voice generators operate in very different ways, only one specific version is described here, by way of example, according to the FIGURE. Further equivalent versions are, of course, possible in the sense of this invention. The voice generator is in this case based on a system which collates complete spoken texts using individual voice modules produced in advance. These voice modules are normally stored in a database in the form of so-called soundfiles. A complete text can thus be made up as a sequence of voice modules, which can be represented as a chain of the corresponding voice module numbers (soundfile numbers).

In this specific refinement of the invention, the "coded" traffic information which has been searched for is thus supplied to the voice generator, in order to produce a chain of these soundfile numbers from this information in a first processing step. The collated information, that is to say the "order" now comprises a chain of soundfile numbers, which are stored under the reference code ("order number"). The "order" is thus ready for "collection", and the reference code is transmitted to the user. The conversion of the relevant traffic information into spoken form does not take place until after the call, immediately before transmission by the voice channel.

In a further development of the invention, the individual messages in the collated traffic information are in each case uniquely identified by the information center. These identifiers can be transmitted to the user. For example, this allows the user to know (even if only in coded form) what and how many messages there are for him. However, the major usefulness becomes fully apparent when these identifiers are temporarily stored by the user in the course of a number of successive requests, as can occur, for example, during relatively long journeys, and are transmitted with the respective next request to the information center. Specifically, this information can be used centrally to avoid taking into account already known messages any more. This results in a further considerable improvement in the relevance of the transmitted traffic information.

With the response from the information center, the user receives the reference code, which he can use to call up the collated information. It is advantageous, but not essential, once again to use the SMS channel of a GSM mobile radio network for this purpose. It is of course, particularly worthwhile for the user to have a telephone set with appropriately expanded functions, which evaluates the received information, extracts the reference code, and dials the information center automatically or by pushing a button. It is particularly advantageous in this case for the reference code to be coded as an extension to the information center's telephone number. On receiving the call, the information center can thus extract the extra digits and can identify the previous "order". The reference code can, of course, also be transmitted after setting up the voice link, for example using the DTMF method (dual tone multiple frequency).

The reference code is thus known to the information center when the voice link is set up. According to the specific refinement shown in the FIGURE, the chain of soundfile numbers stored under the reference code is now supplied to the voice generator which, in a second processing step, assembles the referenced voice modules to form the complete text in spoken form.

The convenience for the user can be further enhanced by opening up at least simple control options via the voice channel that has been set up. In this context, it would be possible, for example, to use the conventional DTMF telephone network method to allow control by the user by pressing a key. In this way, interactive control options can be provided as in the case of an audio tape: FORWARD, REVERSE, FAST FORWARD or else direct selection of a specific message. Whether and how this refinement can be implemented depends on the specific functionality of the electronic data processing system in the information center, and of the voice generator.

The invention is based on the described three-stage information interchange. With the collation of the information, it would intrinsically be possible to set up a voice link directly from the information center, and thus to avoid the need to transmit the reference code back. Allocation of such a reference code would be unnecessary in this case. However, since the costs are normally borne by the caller in public telephone networks, the communication costs would all be incurred centrally. For commercial operation of such a service, it would thus be necessary to find different payment methods in each case, based on individual contract relationships. In contrast to this, the method of the invention is distinguished by direct charging to the customer on the basis that he is a subscriber to the respective telephone network.

The details of the described sequence are not all essential, but in some cases only expedient. Thus, for example, the entire voice production process, that is to say the two processing steps relating to this shown in the FIGURE, could be carried out only after the voice link has been set up. This is admittedly within the context of the invention, but would have disadvantages, since the processing is time-consuming. The process illustrated in the FIGURE by way of example; in contrast minimizes the complexity while the expensive and time-critical voice link is in existence.

What is claimed is:

1. A method for providing and transmitting individualized traffic information to a user relating to a traffic network via a telephone network having at least one voice channel, wherein the traffic information is selected from a traffic database within an information center on request by the user, and is transmitted in voice form via the voice channel of the telephone network, the method comprising the steps of:

transmitting by the user a character-coded request to the information center containing at least information relating to the user's current location from which vicinity traffic information is desired;

searching the traffic database for traffic information relevant to the request;

assigning a reference code to the traffic information being searched in the information center;

transmitting the assigned reference code to the user;

calling by the user the searched traffic information by quoting the transmitted reference code;

transmitting the searched traffic information to the user;

transmitting predefined reference codes when said step of searching the traffic database is unsuccessful; and terminating the process without setting up the voice link.

2. The method set forth in claim 1, wherein data relating to the user's current location includes a desired travel route.

3. The method set forth in claim 1, wherein data relating to the user's current location includes details relating to a geographical position of the user.

4. The method set forth in claim 3, further comprising transmitting information relating to a desired travel direction with the transmitted request.

5. The method set forth in claim 3, further comprising:

transmitting information relating to traffic information already obtained by the user with the transmitted request;

evaluating in the information center the information relating to traffic information already obtained by the user; and excluding the traffic information already obtained by the user from said step of searching the traffic database.

6. The method set forth in claim 1, further comprising the step of setting up a voice link in a GSM mobile radio network in order to transmit the traffic information to the user, wherein said step of transmitting the request is performed as a data message on a SMS channel of a GSM mobile radio network and said step of transmitting the assigned reference code is performed on an SMS channel of the GSM mobile radio network.

7. The method set forth in claim 6, further comprising transmitting the reference code received by the user to the information center in coded form when setting up the voice link.

8. The method set forth in claim 7, wherein said step of transmitting the reference code is performed as part of a telephone number dialed by the user to set up the voice link.

9. The method set forth in claim 1, wherein said step of transmitting predefined reference codes is performed when a predetermined fault condition occurs.

10. A The method set forth in claim 1, further comprising:

retaining in a memory device the determined traffic information after processing the transmitted request together with the assigned reference code for a predetermined time period; and automatically deleting the retained information after expiration of the predetermined time period.

11. The method set forth in claim 10, wherein said predetermined time period is 1 hour.

12. The method set forth in claim 1, further comprising:

evaluating in the information center the transmitted character-coded request to determine the geographical region of the traffic network relevant to the search;

determining whether there is any traffic information for the determined geographical region; and allocating the reference code for the request.

13. The method set forth in claim 12, wherein said steps of evaluating, determining and allocating are performed automatically.

14. The method set forth in claim 12, further comprising:

predetermining control parameters for the determination of the relevant geographical regions and for influencing a shape, size and alignment of the geographical region;

considering the geographical position transmitted in the request when determining the control parameters in the information center; and wherein said step of searching is performed for traffic regions defined in accordance with the control parameters.

15. The method set forth in claim 14, further comprising transmitting by the user during the request additional information for influencing the control parameters.

16. The method set forth in claim 1, further comprising:

providing the searched traffic information with identifiers in the information center; and transmitting the identifiers to the user together with the reference code.

17. The method set forth in claim 16, further comprising:

temporarily storing at the user end the identifiers for traffic information which has already been obtained; and transmitting the temporarily stored identifiers as a component of the character-coded request to the information center.

18. A method for providing and transmitting individualized traffic information to a user relating to a traffic network via a telephone network having at least one voice channel, wherein the traffic information is selected from a traffic database within an information center on request by the user, and is transmitted in voice form via the voice channel of the telephone network, the method comprising the steps of:

transmitting by the user a character-coded request to the information center containing at least information relating to the user's current location from which vicinity traffic information is desired;

searching the traffic database for traffic information relevant to the request;

assigning a reference code to the traffic information being searched in the information center;

transmitting the assigned reference code to the user;

calling by the user the searched traffic information by quoting the transmitted reference code;

transmitting the searched traffic information to the user;

storing the traffic information in the traffic database in coded form;

collating individual traffic information in coded form and retaining it together with the reference code for a call by the user; and when the user calls the traffic information, converting the collated coded traffic information into the individual traffic information in spoken voice form.

19. The method set forth in claim 18, further comprising:

producing information texts for traffic information by arranging correspondingly selected voice modules in sequence, said producing being performed by a voice generator having a database of voice modules denoted by voice module numbers;

retrieving in coded form the relevant traffic information being searched from the traffic database;

converting by the voice generator the coded traffic information being searched into an individually collated chain of voice module numbers, said converting being a first processing step;

maintaining the individually collated chain of voice module numbers with a corresponding reference code in the information center for call by the user; and converting by the voice generator the chain of voice module numbers into spoken information for transmission in the voice channel, wherein this step of converting is a second processing step.

20. The method set forth in claim 19, further comprising interactively controlling the call to the traffic information by the user, wherein individual messages are repeated and switched to a next message as required.

21. The method set forth in claim 20, further comprising controlling the calling process by pressing a DTMF key.

22. The method set forth in claim 20, further comprising controlling the calling process by voice input of the user.

23. The system in accordance with claim 25, wherein said character-coded request further comprises information relating to traffic information already obtained by the user, said electronic data processing system evaluating the traffic information already obtained by the user and eliminating it from the traffic information being searched.

24. The system in accordance with claims 25, wherein said telephone network comprises a GSM mobile radio network having an SMS channel, said request being transmitted to the information center as a data message via the SMS channel, and said reference code being transmitted to the user via the SMS channel.

25. A system for providing individualized traffic information to a user comprising:

a telephone network having at least one voice channel;

an information center connected to the telephone network and having an electronic data processing system and a traffic database stored in the electronic data processing system; and a plurality of terminals providing individualized traffic information relating to a traffic network to users when called by an individual user, said traffic information being transmitted to a respective one of the plurality of terminals in voice form via the at least one voice channel;

wherein said terminals transmit character-coded requests to the information center comprising at least details relating to a geographic position of the user from which vicinity traffic information is desired and details relating to a travel route;

said electronic data processing system searching for the traffic information relevant to the request in the traffic database and allocating a reference code to the searched traffic information for subsequent call by the user, said reference code being transmitted to the user via the telephone network, wherein the user can call the traffic information being searched by transmitting the allocated reference code to the information center, said searched traffic information being transmitted to the user terminal when called by the user; and predefined reference codes stored in the information center, said predefined reference codes being transmitted to the terminal when the search in the traffic database is unsuccessful.

26. The system in accordance with claim 25, wherein said predefined reference codes are transmitted to the terminal when the search in the traffic database results in a predetermined fault condition.

27. The system in accordance with claim 25, wherein said reference code received by the terminal is transmitted in coded form in the voice channel when setting up a voice link.

28. The system in accordance with claim 25, further comprising a memory device in the information center where said electronic data processing system stores traffic information responsive to the request along with the allocated reference code for a predetermined period of time for the user to call, said electronic data processing system deleting the stored traffic information and allocated reference code upon expiration of the predetermined period of time.

29. The system in accordance with claim 28, wherein said predetermined period of time comprises 1 hour.

30. The system in accordance with claim 25, wherein said electronic data processing system comprises programming adapted to automatically evaluate the character-coded request to determine the geographical region of the traffic network relevant to the search, determine whether there is any traffic information for a determined relevant geographical region, identify the traffic information for these geographical regions, and transmit the allocated reference code for the respective request.

31. The system in accordance with claim 25, wherein said electronic data processing system comprises programming adapted to provide the searched traffic information with identifiers in the information center and transmit the identifiers to the respective terminal together with the allocated reference code.

32. The system in accordance with claim 31, wherein identifiers for traffic information already obtained by the user are stored in the terminal and are transmitted to the information center as a component of the character-coded request.

33. A system for providing individualized traffic information to a user comprising:

a telephone network having at least one voice channel;

an information center connected to the telephone network and having an electronic data processing system and a traffic database stored in the electronic data processing system; and a plurality of terminals providing individualized traffic information relating to a traffic network to users when called by an individual user, said traffic information being transmitted to a respective one of the plurality of terminals in voice form via the at least one voice channel;

wherein said terminals transmit character-coded requests to the information center comprising at least details relating to a geographic position of the user from which vicinity traffic information is desired and details relating to a travel route;

wherein said electronic data processing system searching for the traffic information relevant to the request in the traffic database and allocating a reference code to the searched traffic information for subsequent call by the user, said reference code being transmitted to the user via the telephone network;

wherein the user can call the traffic information being searched by transmitting the allocated reference code to the information center, said searched traffic information being transmitted to the user terminal when called by the user; and a memory device in the information center where said electronic data processing system stores traffic information responsive to the request along with the allocated reference code for a predetermined period of time for the user to call, said electronic data processing system deleting the stored traffic information and allocated reference code upon expiration of the predetermined period of time, wherein said individually collated traffic information is provided to the user in spoken voice form and is stored in spoken voice form in the information center for a predetermined period of time.

34. A system for providing individualized traffic information to a user comprising:

a telephone network having at least one voice channel;

an information center connected to the telephone network and having an electronic data processing system and a traffic database stored in the electronic data processing system; and a plurality of terminals providing individualized traffic information relating to a traffic network to users when called by an individual user, said traffic information being transmitted to a respective one of the plurality of terminals in voice form via the at least one voice channel;

wherein said terminals transmit character-coded requests to the information center comprising at least details relating to a geographic position of the user from which vicinity traffic information is desired and details relating to a travel route;

said electronic data processing system searching for the traffic information relevant to the request in the traffic database and allocating a reference code to the searched traffic information for subsequent call by the user said, reference code being transmitted to the user via the telephone network;

wherein the user can call the traffic information being searched by transmitting the allocated reference code to the information center, said searched traffic information being transmitted to the user terminal when called by the user, and wherein the traffic information is stored in the traffic database in coded form and the individual traffic information is collated in coded form and retained together with the reference code for calling by the user, said information center further comprising a voice generator for converting the collated and coded individual traffic information into spoken voice form for transmission to the user terminal when the user calls the traffic information.

35. The system in accordance with claim 34, wherein said voice generator comprises a database having voice modules having voice module numbers, said spoken voice form being produced for the traffic information by arranging selected voice modules in sequence; and wherein said searched traffic information is obtained in coded form from the traffic database, said voice generator converting the coded information being searched into an individually collated chain of voice module numbers in a first processing step, said electronic data processing system storing the individually collated chain together with the corresponding reference code for calling by the user, said voice generator converting chain of voice module numbers into spoken voice information for transmission in the voice channel in a second processing step.

36. The system in accordance with claim 35, wherein said electronic data processing is capable of interactively controlling the user's call to the traffic information such that individual messages are repeated and the system switches to the next message as required.

37. The system in accordance with claim 36, wherein said call to the traffic information is controlled using DTMF.

38. The system in accordance with claim 36, wherein said call to the traffic information is controlled using a voice input by the user.

* * * * *

UNITED STATES PATENT AND TRADEMARK OFFICE
CERTIFICATE OF CORRECTION

PATENT NO. : 6,304,758 B1 — Page 1 of 1
DATED : October 16, 2001
INVENTOR(S) : Wolfgang Herbig It is certified that error appears in the above-identified patent and that said Letters Patent is hereby corrected as shown below:

<u>Title page,</u>
Item [75], please correct first inventors name to read: -- Wolfgang Herbig --

Signed and Sealed this

Fourth Day of June, 2002

*Attest:*

JAMES E. ROGAN

*Attesting Officer* — *Director of the United States Patent and Trademark Office*